United States Patent [19]

Willingham

[11] Patent Number: 4,619,412

[45] Date of Patent: Oct. 28, 1986

[54] POULTRY LITTER DISINTEGRATING MACHINE

[76] Inventor: Jack Willingham, Rte. 7-Box 218, Mt. Pleasant, Tex. 75455

[21] Appl. No.: 766,970

[22] Filed: Aug. 19, 1985

[51] Int. Cl.$^4$ ............................................. B02C 21/02
[52] U.S. Cl. ................................ 241/101.7; 15/93 B; 404/91
[58] Field of Search ............... 15/93 B; 241/101.7; 404/90, 91

[56] References Cited

U.S. PATENT DOCUMENTS 2,768,794 10/1956 Putnam ........................... 404/90 X Primary Examiner—Mark Rosenbaum
Assistant Examiner—Timothy V. Eley
Attorney, Agent, or Firm—Kimmel, Crowell & Weaver

[57] ABSTRACT

A tractor-drawn machine reduces a hardened layer of litter on the floor of a poultry house to a pulverized state so that it may be reused on the floor or easily removed therefrom. A leading scraper blade of the machine slightly elevates the hardened litter layer and as the hardened layer traverses grid plates immediately behind the scraper blade, it is acted upon by rotating flail hammers having chopping heads. The pulverized material is discharged at the rear of the traveling machine and is deposited back onto the floor of the poultry house.

8 Claims, 5 Drawing Figures

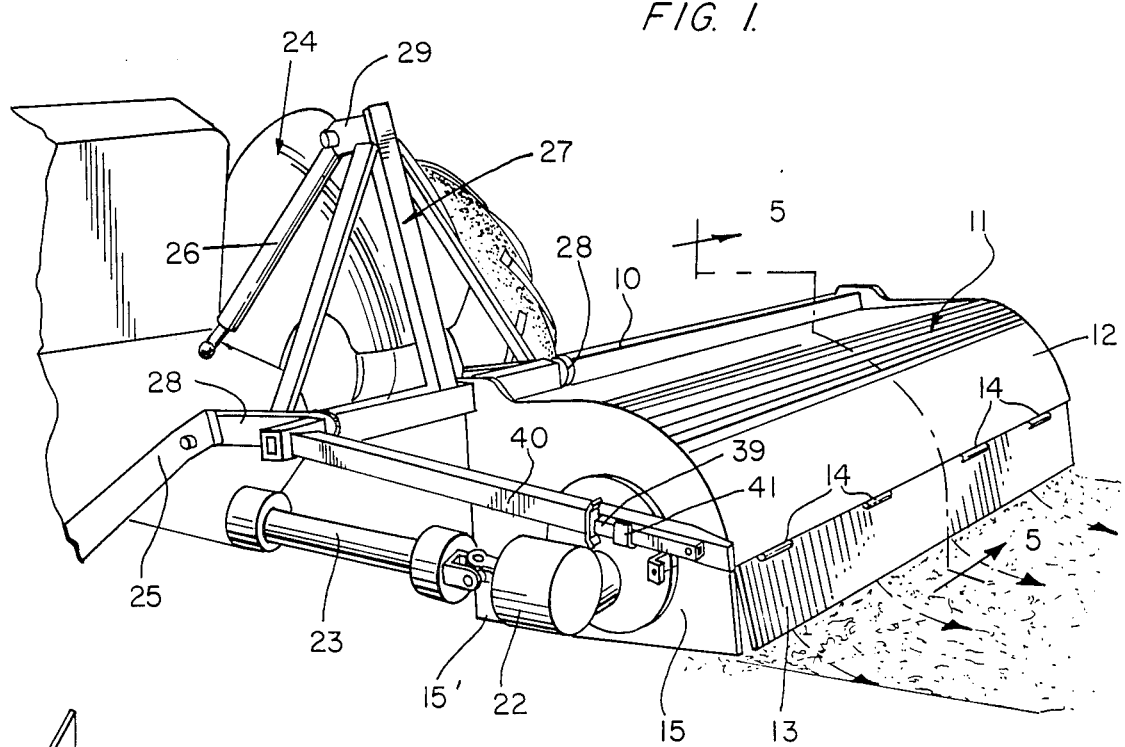
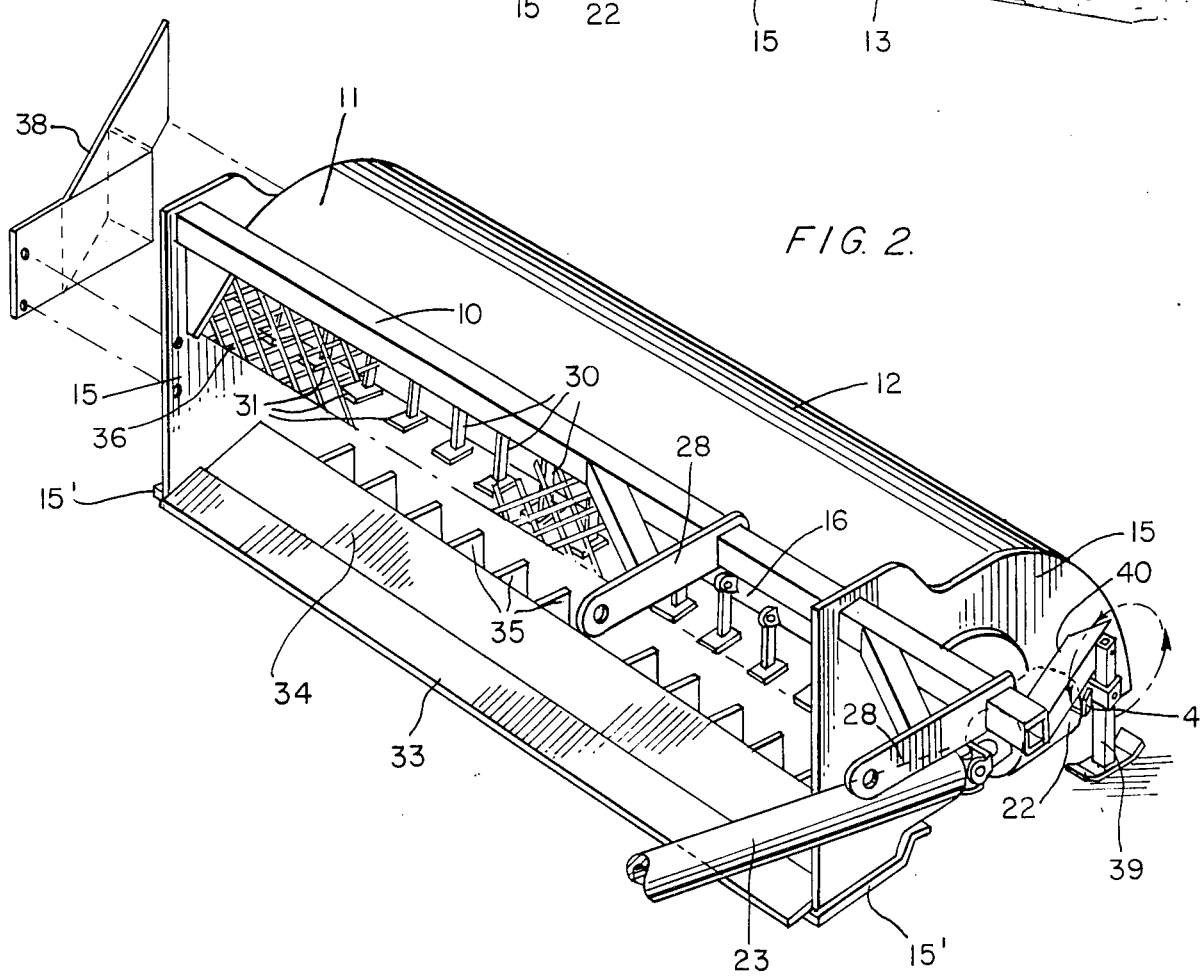

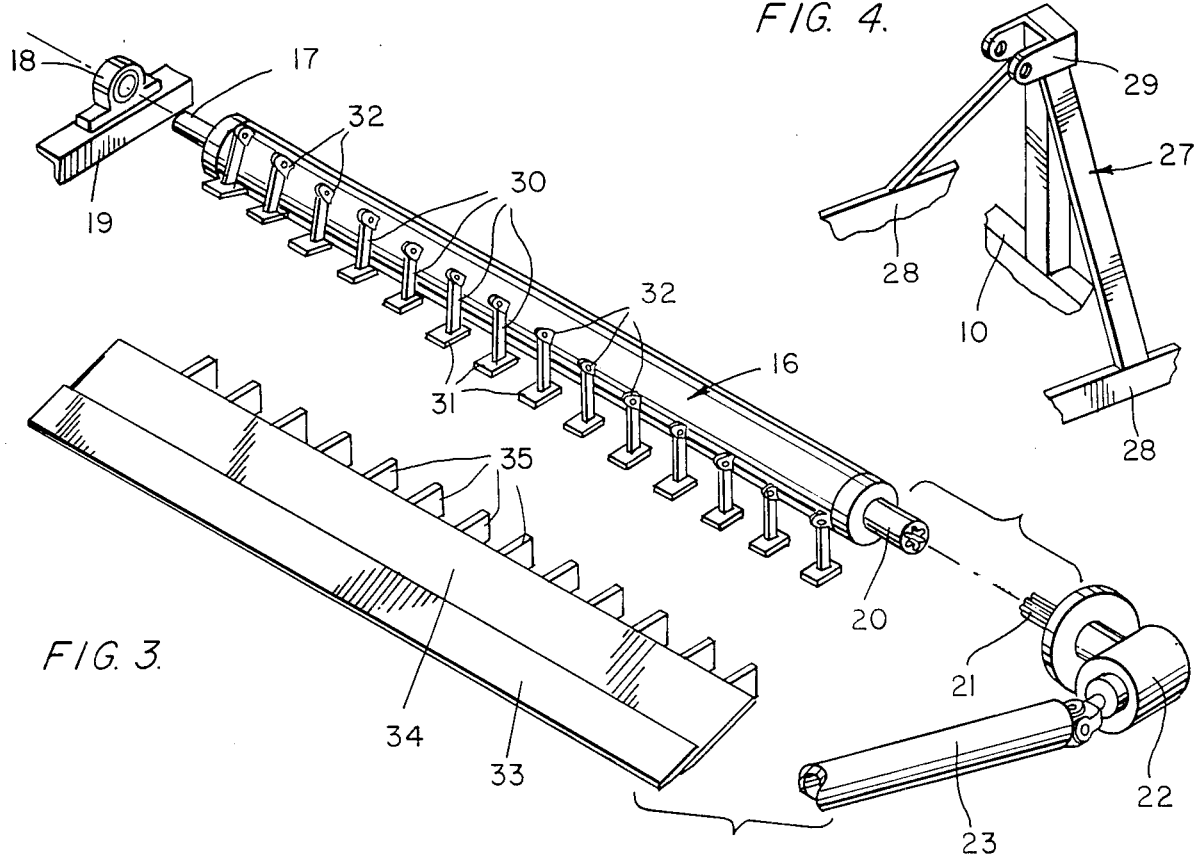
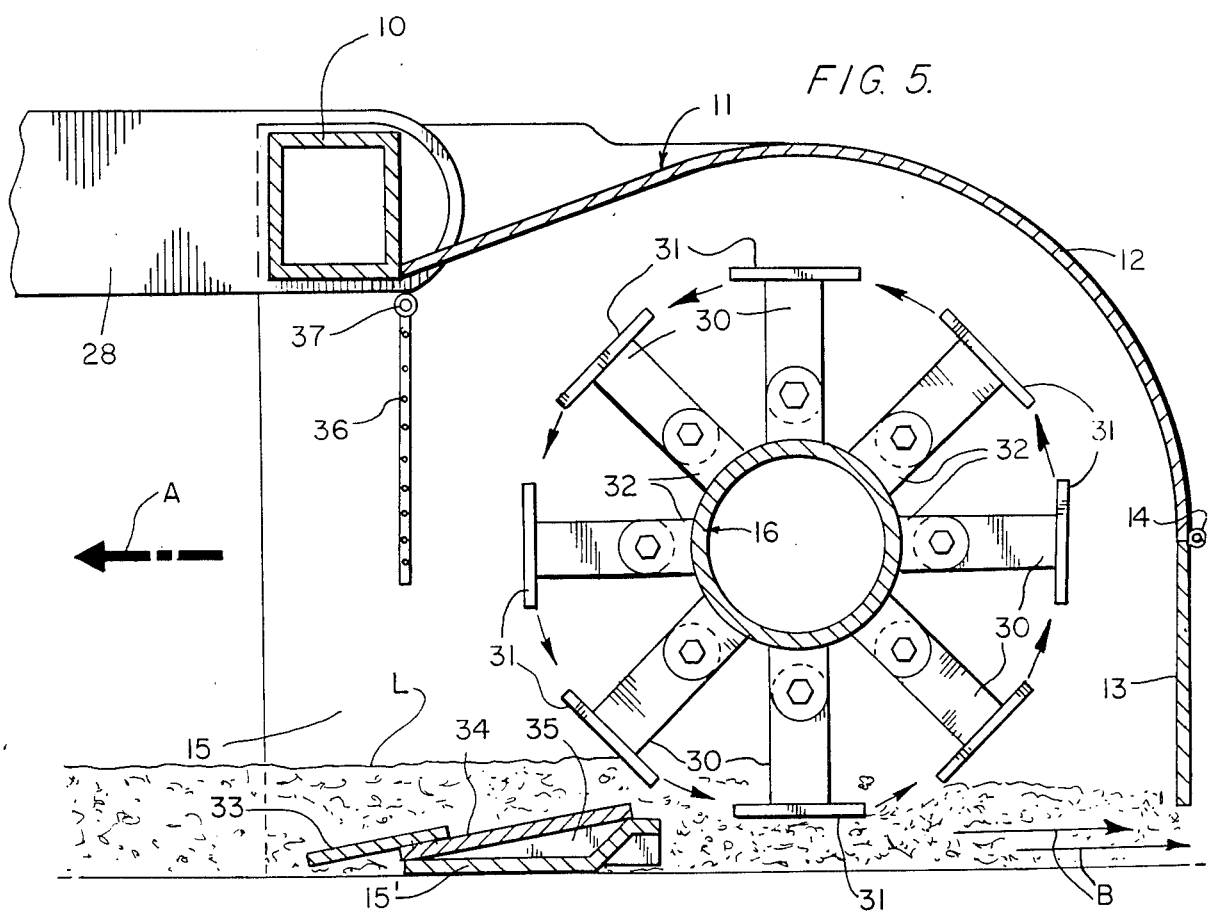

POULTRY LITTER DISINTEGRATING MACHINE

BACKGROUND OF THE INVENTION

Commercial poultry houses may have concrete floors, but such floors have become prohibitively expensive and therefore, at the present time, most poultry houses have dirt floors. In either case, sawdust is applied to the floor in a layer up to several inches thick. Over a period of time, the chicken manure becomes mixed with the sawdust, saturates it, and ultimately results in the formation of a solidified hard layer of litter on the poultry house floor which must not be left intact or allowed to build up indefinitely.

Certain prior art machines typified by U.S. Pat. Nos. 3,263,257; 3,845,516; and 3,662,420 address the problem of removing poultry litter from the floors of large commercial poultry houses. The prior art machines are concerned only with the removal of litter and, in some instances, do a less than adequate job of acting on the hardened layer of litter to reduce it to a state where it can be effectively removed. As a consequence, considerable amounts of hardened litter remain on the poultry house floor and this is undesirable.

In contrast to the known prior art, the present invention is embodied in a simple machine whose purpose is to act on the hardened layer of litter on the poultry house floor and reduce it to a pulverized state where it can be mixed with additional sawdust for reuse on the floor or easily removed from the poultry house, if the latter is deemed desirable. In accomplishing this objective, the present invention is constructed to first scrape and pry up the hardened layer of litter from the floor as the machine advances along the floor behind a tractor. The slightly elevated layer of litter passes above a system of grid plates attached to the scraping and prying blade and is acted upon by rotating flail hammers which reduce the litter to a pulverized state within a housing of the machine which encloses the flail rotor structure. The pulverized litter discharges back onto the floor at the rear of the traveling machine. The flail rotor is powered by the power take-off shaft of the tractor which carries the machine through a three point hitch.

An objective of the present invention is to provide a machine of the above-described type which is compact and substantially unitary in construction, durable, safe to operate, and which requires little maintenance.

Other features and advantages of the invention will become apparent to those skilled in the art during the course of the following detailed description.

BRIEF DESCRIPTION OF THE DRAWINGS

FIG. 1 is a rear perspective view of a poultry litter disintegrating machine according to the present invention.

FIG. 2 is a partly exploded front perspective view of the machine.

FIG. 3 is an exploded perspective view of coacting machine components.

FIG. 4 is a fragmentary perspective view of the machine hitch used for transporting it behind a farm tractor.

FIG. 5 is an enlarged transverse vertical section taken on line 5—5 of FIG. 1.

DETAILED DESCRIPTION

Referring to the drawings in detail wherein like numerals designate like parts, a sturdy transverse horizontal frame bar 10 has rigidly secured to its rear side a transversely elongated housing 11 which includes a quarter-round upper rear wall 12 carrying a depending normally vertical deflector plate 13 secured thereto by hinges 14. The housing 11 is forwardly open and also open at its bottom. The housing includes vertical end walls 15, as shown. As best shown in FIGS. 2 and 5, the bottoms of the housing end walls 15 are equipped with wear plates or runners 15' which engage the poultry house floor and slide along the floor during machine operation. No other parts of the machine are in contact with the floor during its operation.

Within the rear portion of the housing 11, concentrically with the wall 12, is a horizontal transverse tubular flail rotor shaft 16 having an end extension 17 journaled in a bearing 18 mounted on a frame member 19, as best shown in FIG. 3. The other end of the shaft 16 carries an internally splined drive extension 20, coupled with an externally splined shaft 21 of a conventional right angle gear drive 22, operatively coupled with a forwardly extending side longitudinal drive shaft 23 driven by the power take-off shaft of a tractor 24, FIG. 1, behind which the machine is transported.

The tractor 24 is equipped with a standard adjustable three point hitch including lift arms 25 and an extensible link 26. A rigid hitch assembly 27 of the litter disintegrating machine includes lower longitudinal arms 28 fixed to the frame bar 10 and extending forwardly thereof. These arms are connected with the tractor lift arms 25. The top of the hitch assembly 27 carries a coupling yoke 29 connected with the extensible link 26 of the tractor three point hitch. The machine is bodily carried by the tractor hitch and can be raised and lowered relative to the poultry house floor, as required.

The flail rotor shaft 16 carries along its length a plurality of spirally arranged equidistantly spaced flail hammers 30 having chopping heads or plates 31 at their free ends. The flail hammers 30 are of equal lengths and are pivotally secured at their inner ends to short radial anchor lugs 32 on the periphery of the shaft 16. When the shaft 16 is rotating during machine operation, the flail hammers 30 extend themselves radially, as shown in FIG. 5, under the influence of centrifugal force. When so extended, the chopping plates 31 of the hammers are spaced approximately ⅜" from the housing wall 12 and are also spaced somewhat above the floor of the poultry house which is being engaged by the runners 15'. The flail hammer rotor turns in the direction of the arrows in FIG. 5 or counterclockwise in that view, while the machine is moving forwardly in the direction of the arrow A. When the machine is at rest, the flail hammers 30 hang vertically from the shaft 16 as shown in FIGS. 2 and 3.

An important feature of the machine comprises a fixed somewhat inclined litter pre-cutting, scraping and elevating blade 33 disposed forwardly of the flail hammer rotor, substantially at the bottom of the housing 11 and rotor and immediately above the floor-engaging runners 15'. The blade 33 extends horizontally and transversely across the front of the machine with its opposite ends fixed between the end walls 15 of the housing. The pre-cutting blade 33 is attached by welding to a support plate 34 beneath the blade 33 and extending rearwardly thereof. A plurality of laterally spaced vertical grid plates 35 are fixed to the bottom of support plate 34 and extend below the same and rearwardly thereof, as shown in the drawings. The bottom edges of the grid plates 35 are immediately above the runners 15' and do not contact the poultry house floor, which is engaged only by the runners, as previously explained. When the flail hammers 30 are extended, FIG. 5, their chopping plates 31 clear the rear upper corners of the grid plates 35 by approximately ½".

A safety guard 36 of expanded metal is pivotally suspended from a rod 37 secured to and extending between the housing side walls 15. The purpose of the guard 36 is to block the movement of any part of the flail rotor which might separate from the rotor during machine operation and pass through the open front of the housing 11 causing personal injury. The hanging guard 36 will prevent such an injury from occurring in the very unlikely event that one of the hammers 30 would separate from the rotor.

A further safety feature is the provision on the housing end wall 15 remote from the drive shaft 23 of a guard 38, FIG. 2, for the exposed end of the flail rotor shaft 16. This guard is attached by bolts or other suitable means to the adjacent wall 15.

A pivoted kick stand 39 is attached to a longitudinal frame bar 40 of the machine disposed outwardly of the adjacent end wall 15. When the machine is in active operation, the kick stand 39 is stowed horizontally in an elevated position on a rest 41, as shown in FIG. 1. When the machine is being separated from the tractor three point hitch, the kick stand 39 is placed in the vertical position shown in FIG. 2 so that it can support the adjacent heavy end of the machine carrying the gear drive 22, shaft 23 and hitch structure 27.

OPERATION

The machine is attached to the three point hitch of the tractor 24 and adjusted vertically relative to the poultry house floor so that the runners 15' make contact with the poultry house floor. The tractor advances with the machine along the floor and the leading pre-cutting blade 33 digs into the hardened litter layer L causing the layer to separate from the floor and to be elevated as the plates 33 and 34 travel beneath it. The separated layer of litter passes over the vertical grid plates 35 as the machine moves forwardly and the flail rotor chopping plates 31 act on the litter just as it is above the grid plates 35 and reduce it to a pulverized state. The pulverized litter passes rearwardly from the machine and beneath the rear deflector plate 13, as shown by the arrows B in FIG. 5. The pulverized litter is deposited behind the moving machine in a layer on the floor as shown in FIG. 1. If desired, the pulverized litter can be removed from the floor using a front end loader or the like. Additional sawdust can also be added to the pulverized litter and the litter can be reconditioned and reused whenever this appears to be desirable.

The machine embodying the invention is characterized by simplicity of construction and efficiency of operation for its intended purpose.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. A poultry litter disintegrating machine comprising a housing which is substantially open at its forward side and bottom and being provided with end walls and at least a partly curved top wall, a rigid hitch structure on the housing adjacent to its forward side and extending above the top of the housing and being adapted for coupling with a tractor three point hitch, a transverse horizontal axis flail rotor within and journaled on the housing and extending between the housing end walls and carrying a multiplicity of pivoted flail hammers having litter chopping heads along its length, power drive means for the flail rotor including a drive component on one end wall of the housing, runners on the end walls of the housing adapted to engage a poultry house floor during movement of the machine therealong, and a fixed somewhat inclined litter layer pre-cutting blade on the housing near its bottom and forward side and immediately above said runners and near the bottom of said flail rotor.

2. A poultry litter disintegrating machine comprising a support frame adapted to be carried by a tractor three point hitch, a transverse axis flail rotor on the support frame having a multiplicity of equal length flail hammers in spaced relationship along its length, each flail hammer having a chopping head at its free end, power means to drive said rotor and adapted to be coupled with a tractor power take-off shaft, a housing for said rotor carried by the support frame and being forwardly open and open at its bottom, poultry house floor engaging means on the bottom of said housing, and a litter layer pre-cutting blade means on the housing near its bottom and forward side and near the bottom of the rotor and somewhat above the floor engaging means, and the blade means being operable to penetrate a hardened litter layer on the floor of a poultry house during advancement of the machine and to elevate the layer somewhat from the floor and position the layer so that it may be struck and disintegrated by the flail hammer chopping heads during rotation of said rotor.

3. A poultry litter disintegrating machine as defined in claim 2, and said chopping heads moving in closely spaced relationship to said pre-cutting blade means during rotor rotation and being more distantly spaced from the wall of said housing.

4. A poultry litter disintegrating machine as defined in claim 3, and a plurality of laterally spaced vertical grid plates on the pre-cutting blade means and extending somewhat rearwardly thereof in closely spaced relationship to said chopping heads during rotation of the rotor.

5. A poultry litter disintegrating machine comprising a frame adapted to be carried by a tractor, a housing attached to the frame and being open at its forward side and bottom, a transverse horizontal axis flail hammer rotor on the frame and being disposed within said housing, driving means for the flail hammer rotor adapted for connection with a tractor power take-off shaft, runner elements at least on the opposite ends of said housing adapted to engage the floor of a poultry house during movement of the machine along such floor, a leading somewhat inclined transverse litter pre-cutting blade on the housing near its forward end and bottom and slightly above said runner elements, a plurality of laterally spaced vertical grid plates attached to the bottom of the litter pre-cutting blade and extending somewhat rearwardly thereof and being in closely spaced relationship to flail hammers on said rotor when said rotor is revolving, whereby a solidified layer of poultry litter is engaged and somewhat elevated by said pre-cutting blade and is then acted on and pulverized by the flail hammers of said rotor when the solidified layer is above said vertical grid plates and the rotor is turning in a direction such that its top is moving in the direction of movement of the machine, and a rigid hitch structure secured to said frame adjacent to the forward side of said housing and extending above the housing and being adapted for coupling with a tractor three point hitch.

6. A poultry litter disintegrating machine as defined in claim 5, and said rotor comprising a central rotor shaft, a plurality of apertured lugs on said shaft in a spiral row lengthwise of said shaft, and said flail hammers being pivotally attached to the apertured lugs and being of equal lengths radially of said shaft.

7. A poultry litter disintegrating machine as defined in claim 5, and a safety guard on said housing forwardly of said rotor and depending from a top wall of the housing.

8. A poultry litter disintegrating machine as defined in claim 5, and a hinged vertically swingable deflector plate on the rear of said housing and spaced rearwardly of said rotor and having a bottom edge terminating substantially at the bottom of the rotor when the deflector plate is vertically disposed.

* * * * *